A. G. BRUST.
APPARATUS FOR MOLDING PLASTIC MATERIAL.
APPLICATION FILED JULY 3, 1907.
997,647.
Patented July 11, 1911.
3 SHEETS—SHEET 1.
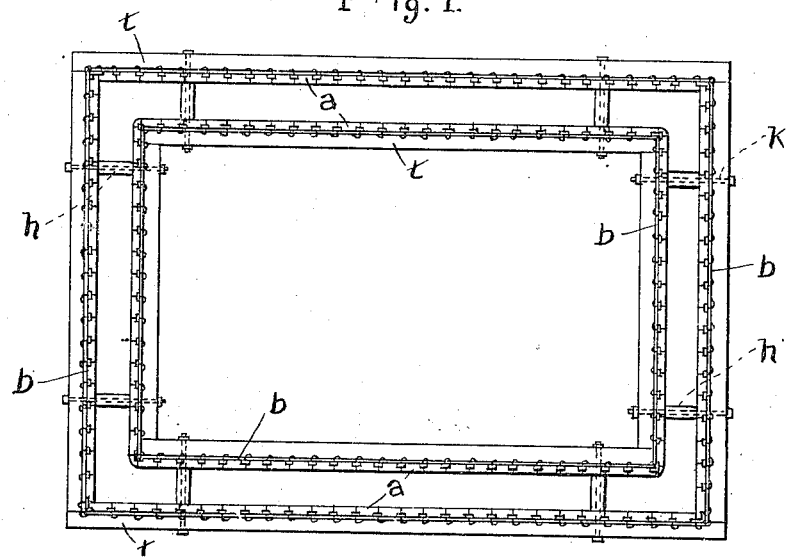
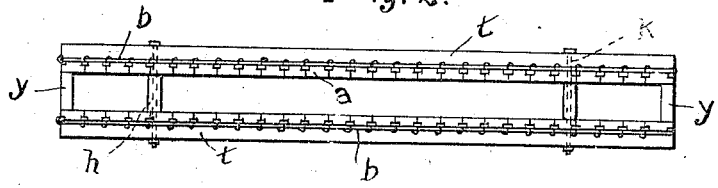
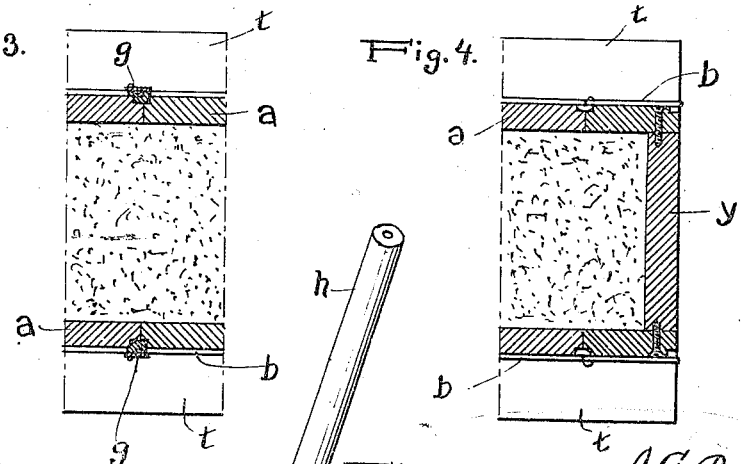
Witnesses
Stuart Hilder.
George M. Anderson.
Inventor
A. G. Brust
By E. W. Anderson
his Attorney A. G. BRUST.
APPARATUS FOR MOLDING PLASTIC MATERIAL.
APPLICATION FILED JULY 3, 1907.
997,647.
Patented July 11, 1911.
3 SHEETS—SHEET 2.
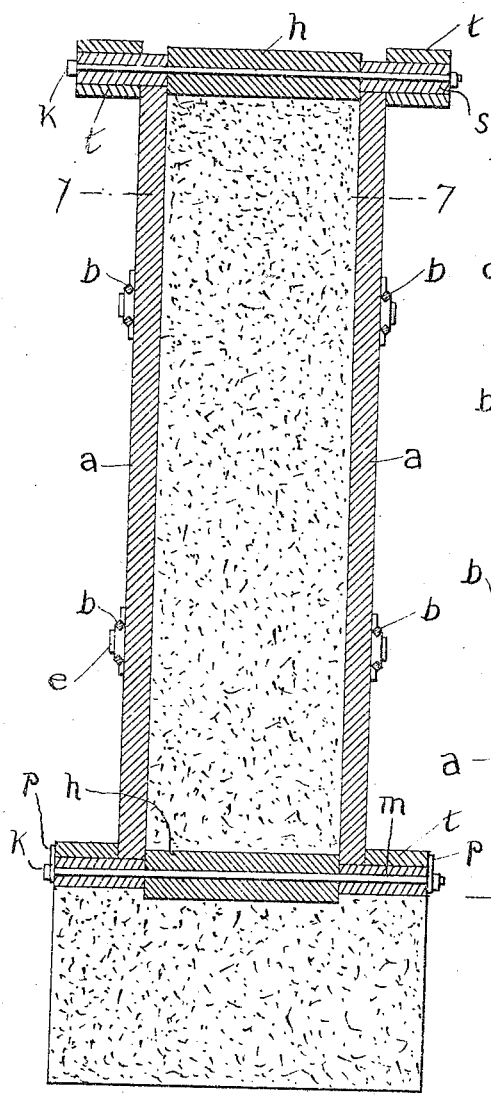
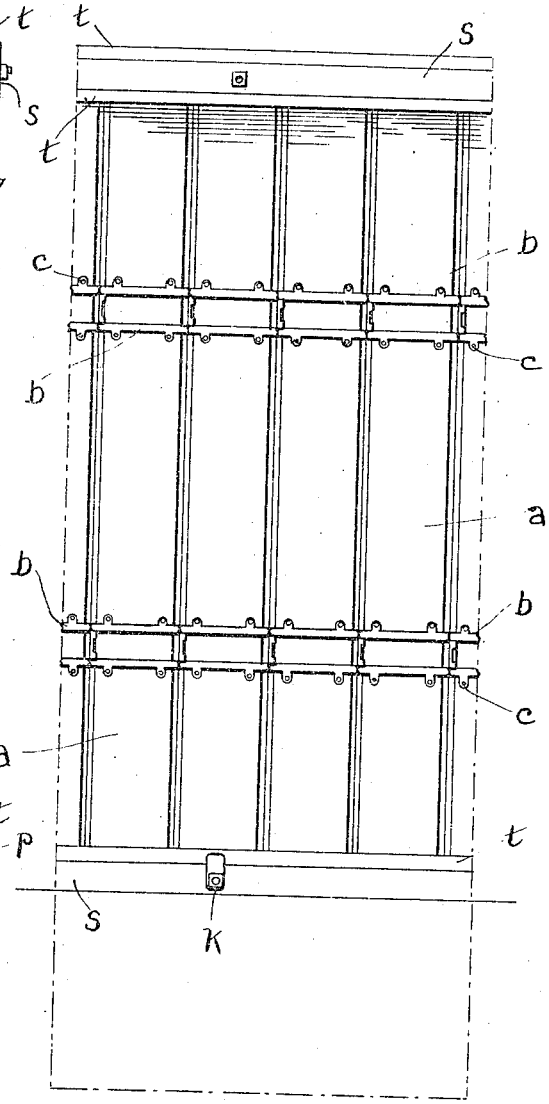
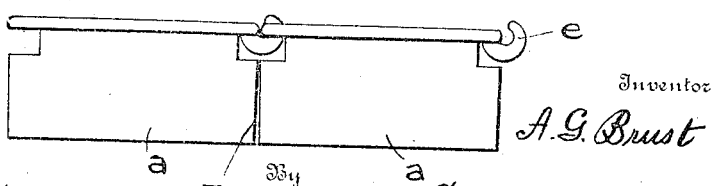

A. G. BRUST.
APPARATUS FOR MOLDING PLASTIC MATERIAL.
APPLICATION FILED JULY 3, 1907.
997,647.
Patented July 11, 1911.
3 SHEETS—SHEET 3.
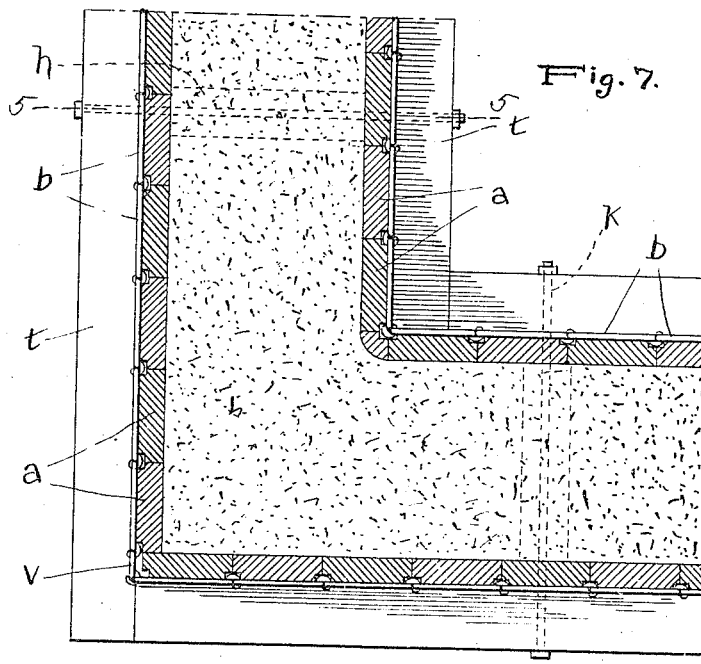
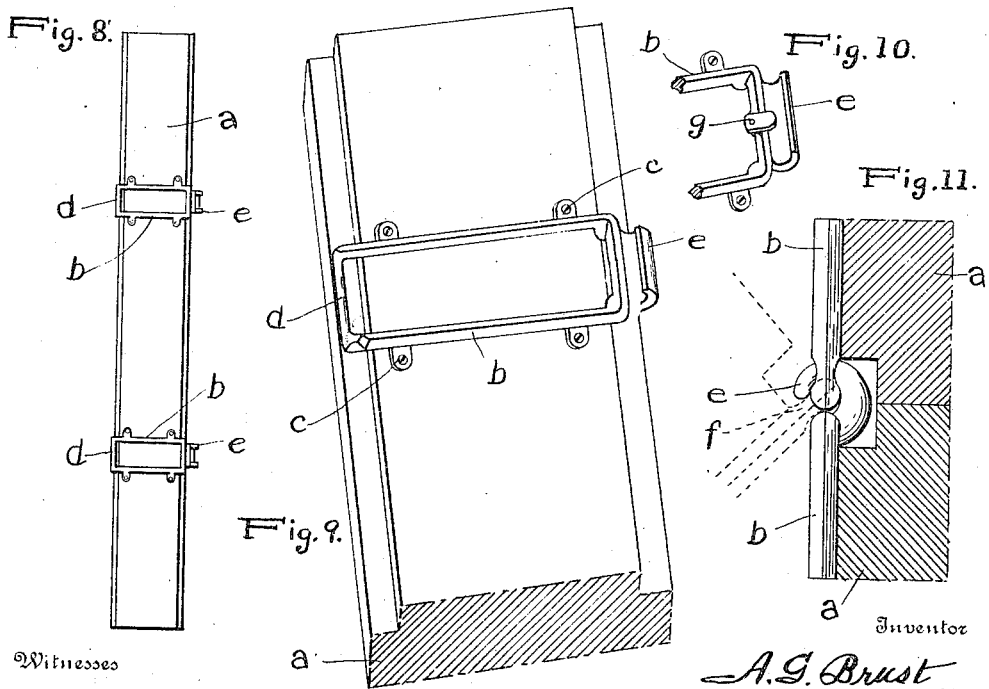

UNITED STATES PATENT OFFICE.

ALBERT G. BRUST, OF WASHINGTON, DISTRICT OF COLUMBIA, ASSIGNOR OF ONE-THIRD TO EDWARD WILLOUGHBY ANDERSON, OF WASHINGTON, DISTRICT OF COLUMBIA.

APPARATUS FOR MOLDING PLASTIC MATERIAL.

997,647.                    Specification of Letters Patent.    Patented July 11, 1911.

Application filed July 3, 1907. Serial No. 382,087.

To all whom it may concern:

Be it known that I, ALBERT G. BRUST, citizen of the United States, resident of Washington, in the District of Columbia, have made a certain new and useful Invention in Apparatus for Molding Plastic Material; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the apparatus, having endless chains with upper parts removed to show chain in full. Fig. 2 is a similar view of a second form of apparatus. Fig. 3 is a detail sectional view showing the special form of link for easy detachment at one point in the endless chain. Fig. 4 is a similar view showing the end portion of the second form of apparatus. Fig. 5 is a vertical section on the line 5—5, Fig. 7. Fig. 6 is a side view of a number of sections of the apparatus. Fig. 7 is a horizontal section on the line 7—7, Fig. 5. Fig. 8 is a side view of one of the sections or elements of the apparatus. Fig. 9 is a fragmentary perspective view of the same on a larger scale. Fig. 10 is a fragmentary perspective view of the modified form of link used at one point in each endless chain. Fig. 11 is a detail sectional view of portions of abutting or adjacent elements, with position of one element as turned for disengagement shown in dotted lines. Fig. 12 is a detail plan view showing two adjacent sections or elements having beveled edges. Fig. 13 is a detail perspective view of one of the brace tubes.

The invention has relation to apparatus for molding walls and partitions of plastic, and especially of concrete, material, and it consists in the novel construction and combinations of parts, as hereinafter set forth.

The object of the invention is mainly to facilitate and thereby to save expense in erecting concrete buildings, and with this object in view it is designed to provide means or apparatus which can be used over and over again in building the same house and in building other houses.

To this end, it is designed by this invention to provide a flexible mold-side consisting of detachable elements, and in connection therewith means for bracing these mold walls in position for use.

In the accompanying drawings the letter $a$, designates an element or stave of the mold-side. This may consist of a board about four feet long by six inches wide and two inches thick. Each stave is designed to fit neatly against the next stave on the inside or molding surface, while the outside is rabbeted or cut away on the edges to provide seats for the knuckles of the link plates $b$. Each stave is designed to be provided with two or more of these link plates, which are firmly secured thereto by means of screws as indicated at $c$. The link used is designed to form a detachable element of a chain of such links, and when a number of staves are connected by their link plates the ribbon like mold-side thereby formed is strong and durable, and capable of long service. Each link plate $b$, has at one end a pivot bar $d$, and at the other a hook lug $e$, adapted to receive such a pivot bar when inserted therein at the proper angle in the manner indicated at $f$. When the stave, being connected in line, is brought into the plane of the other staves the link plate will hold it securely in connection. Two endless chains of such stave-ribbon mold sides are required in some cases to build a section of wall. These are placed opposite each other with their smooth inner surfaces facing, and they are held at the proper distance apart by means of brace tubes $h$, of terra cotta or other suitable material. The length of the tube $h$, governs the thickness of the concrete wall, and as these tubes can be provided very cheaply they can be left in the wall to take the place of concrete filling. Usually, however, on the foundation are laid longitudinal bars or stringers $s$, at the proper distance apart for the thickness of the wall, and the bolts $k$, are passed through perforations $m$, of said stringers, these bolts with the transverse tubes or braces serving to hold them in position at each side of the foundation, where their inner edges serve as narrow parts of the mold wall, the other parts of which are provided by the inner surfaces of the series of upright mold staves or boards $a$. These are placed in series upon the inner portion of each stringer or stringer mold, and are held in place by means of longitudinal brace strips or bearings $t$, which are connected to the stringers by means of buttons, or by means of other suitable fastenings whereby they can be secured in a temporary manner so that the brace bearings can be readily detached after the concrete has set. Similar sets of longitudinal stringers or stringer molds and brace strips, together with their transverse bolts and transverse braces, are provided for the upper edges of the two series of mold staves, and serve to hold these edges in proper relation, the brace strips being connected in this case to the under sides of the stringers. And as these stringers and brace strips are similar to those placed at the lower edges of the mold sides, they are readily interchangeable.

In order that the elements of the endless chain may be readily detached from the wall after is is set the connecting links of two adjacent outside elements of the chain are held together by means of a turn button shown at $g$, or other suitable device, so that upon turning this button to one side the links and elements connected thereby may be pulled apart without the necessity of first forcing the links and elements to angular position with relation to each other. The chain of elements is not necessarily of endless character, however, and may be arranged as shown in figure of the drawings. In this case two separate chains of elements are arranged oppositely to each other, suitably braced in position as before described, the end sections or elements being nailed or otherwise secured to boards or partitions $y$, at the ends of the wall to be molded. In this manner is provided the principal apparatus for building a concrete wall or floor, some simple modifications being had in view for use in molding corners, curved walls, and ceiling girders. A special short link indicated at $v$, is designed to be provided for a stave used in turning corners, whether of an upright wall or of a ceiling. And for building a curved wall the stave-ribbon may have its staves slightly beveled on their lateral edges as indicated at $z$. Usually, however, there will be play enough between the staves for large curvatures. Although these stave-ribbons extend only a few feet in the vertical direction they are designed to be used over and over again in building a wall of any height, in the following manner.

A foundation bed or footing of concrete is first laid in trench according to the plan of the wall, and on this are placed the bracing devices consisting of the stringers, the transverse bolts and the brace tubes. The mold-sides are then placed in position opposite each other so that the lower edges are seated along the inner portions of and bearing on their respective stringers. The exterior brace bearings are then secured in place and another set of stringer molds and bracing devices is placed on top of the mold-sides, so that they are secured in position above and below. Concrete is then filled in between the mold-sides and when it has set sufficiently the lower brace bearings, bolts and stringers are removed, leaving the interior brace tubes in position. The brace bearing along the upper edges of the mold-sides is now detached from the stringers, and the mold sides are removed by detaching sections of the stave-ribbons. These mold sides are then raised to new position above that portion of the wall which has been formed, and put in place resting on the upper stringers which have been left in position supported by the transverse bolts and braces. The stringers, bolts and brace bearings which were used at the foundation along the lower edges of the mold-sides are now put in place along their upper edges, in connection with a new set of brace tubes, so that the mold-sides are held in proper relation to each other. Concrete being then filled in, the wall is then raised thereby a second course, and after it has set sufficiently the mold-sides can be detached as hereinbefore described and raised and secured in position on the stringers supported by the second course of concrete for molding the third course, and so on until the wall is raised to the desired height.

When the concrete work of the building is completed the stave-ribbons and bracing devices can be stored away for use in future work. As these stave ribbons can be put away in sections they can be readily stowed, and their transportation to the place of building is a matter of ordinary wagon work. Being flexible, the stave-ribbons can be arranged to conform with a plan of almost any design, and as they are very strong and durable they are designed to serve an excellent purpose in this important line of work.

Having described my invention, what I claim and desire to secure by Letters Patent is:

1. Apparatus of the class described, consisting of a series of detachably connected mold boards, longitudinal stringer molds unconnected to said mold boards and adapted to engage the ends thereof, longitudinal detachable bearings adapted to engage said stringer molds and abut against said mold boards, and means for holding said bearings to said stringer molds in a detachable manner.

2. Apparatus of the class described, comprising opposite parallel mold sides, each having a longitudinal stringer mold, and a flexible series of upright mold boards having end bearing against said stringer mold, together with detachable longitudinal brace strips, and transverse tie bolts.

3. Apparatus of the class described, consisting of opposite parallel longitudinal stringer molds, opposite parallel series of upright flexibly connected detachable mold boards adapted for end abutment against said stringer molds, longitudinal bearings detachably connected to said stringer molds and adapted to abut against said mold boards, and transverse tie-bolts for holding said stringer molds in parallel relation.

4. Apparatus of the class described, including a mold side, separate longitudinal stringers loose and unconnected with respect thereto and having their inner surfaces in the same plane as and forming continuations of the inner surface of the mold side, said stringers being adapted for detachable engagement with the ends of the mold sides, longitudinal detachable bearings adapted for engagement with said stringers, and means for holding said bearings to said stringers in a detachable manner.

5. Apparatus of the class described, comprising opposite mold sides, separate longitudinal stringers loose and unconnected with respect thereto at each side, and having their inner surfaces forming continuations of the inner surface of the mold side, said mold sides having end bearing against said stringers, detachable longitudinal brace strips, and transverse tie-bolts.

6. Apparatus of the class described, consisting of opposite parallel mold sides, separate longitudinal stringers loose and unconnected with respect thereto at each side, and having their inner surfaces forming continuations of the inner surface of the mold side, said mold sides being adapted for end abutment against said stringers, longitudinal bearings having detachable connection with said stringers and adapted for abutment against said mold sides, and transverse tying means for holding the mold sides and stringers in parallel relation.

7. In apparatus of the class described, the combination with broad flexible molding members consisting of detachably connected boards, of narrow supporting molding members consisting of parallel longitudinal boards and their connecting transverse tie bolts, said narrow members being unconnected to and adapted to be supported by said flexible molding members, and means for holding said flexible molding members flush with said longitudinal molding members.

8. A mold for forming walls of concrete or plastic material, comprising side members oppositely disposed and spaced apart, holding members positioned between the side members horizontally and forming part of the molding face of the side wall of the mold for holding the side members so spaced, and means for holding the holding members.

9. A mold for forming walls of concrete or plastic material, comprising side members oppositely disposed and spaced apart, holding members positioned between the side members horizontally and forming part of the molding face of the side wall of the mold for holding the side members so spaced, and adjustable means for holding the holding members.

10. A mold for forming walls of concrete or plastic material, comprising side members oppositely disposed and spaced apart, holding members positioned between the side members horizontally and forming part of the molding face of the side wall of the mold for holding the side members so spaced, and means for locking the side members and the holding members together to prevent lateral displacement.

11. A mold for forming walls of concrete or plastic material, comprising side members oppositely disposed and spaced apart, holding members positioned between the side members horizontally and forming part of the molding face of the side wall of the mold for holding the side members so spaced, means for locking the side members and the holding members together to prevent lateral displacement, and means for locking the ends of the two side members together.

12. A mold for forming walls of concrete or plastic material, comprising side members oppositely disposed and spaced apart, holding members positioned between the side members horizontally and forming part of the molding face of the side wall of the mold for holding the side members so spaced, means for locking the side members and the holding members together to prevent lateral displacement, means for locking the ends of two side members together, and means for holding the ends of two holding members in alinement.

In testimony whereof I affix my signature, in presence of two witnesses.

ALBERT G. BRUST.

Witnesses:
  ROBERT L. TOLSON,
  H. K. BENTLEY.